March 19, 1946.  E. B. NOLT  2,396,720

HYDRAULICALLY CONTROLLED BALER

Filed April 29, 1944  7 Sheets-Sheet 1

INVENTOR.
Edwin B. Nolt
BY
John B. Brady
ATTORNEY

Patented Mar. 19, 1946

2,396,720

UNITED STATES PATENT OFFICE 2,396,720

HYDRAULICALLY CONTROLLED BALER

Edwin B. Nolt, Ephrata, Pa., assignor to New Holland Machine Company, New Holland, Pa., a corporation of Pennsylvania Application April 29, 1944, Serial No. 533,415

10 Claims. (Cl. 100—19)

My invention relates broadly to pick-up balers for automatically baling hay, straw and the like and more particularly to a system for hydraulically operating the baling mechanism of a pick-up baler.

One of the objects of my invention is to provide a construction of hydraulically operated mechanism for controlling automatic balers for insuring uniformity in size and weight of the bales.

Another object of my invention is to provide an arrangement of hydraulic mechanism for baling hay and straw and the like by which a shorter baling chamber may be employed than has heretofore been employed in mechanically operated balers for thus saving material and weight in the baler construction.

Still another object of my invention is to provide an improved construction of hydraulically operated baler with parts hydraulically controlled for insuring the production of bales of uniform weight when the material to be baled has approximately the same moisture content.

A further object of my invention is to provide a construction of hydraulically operated baler which is capable of baling relatively heavy material without subjecting the baling chamber to undue strain or stress with inherent bulging or springing of the chamber as has been heretofore encountered in mechanically operated automatic balers.

A still further object of my invention is to provide an improved construction of hydraulically operated baler which may be more readily and accurately adjusted and which will require less maintenance than mechanically operated balers heretofore available in the art.

Another object of my invention is to provide an improved construction of hydraulically operated baler having means for increasing the speed of baling operations while cushioning the shock of the required baling forces for thereby reducing wear and maintenance of the baling mechanism.

Still another object of my invention is to provide means for timing the operation of the hydraulically operated ram on a hydraulically controlled automatic baler with a hydraulic control of the wad board and the hydraulic control of the bale compressing means adjacent the tying mechanism position of the baler for insuring successive delivery of securely tied bales with uniform operation of the baler and without appreciable shock.

A further object of my invention resides in the construction of the reversing mechanism for controlling the stroke of the hydraulically operated ram of a hydraulically operated baler in timed relation to the operation of the wad board and the compressing mechanism for the bales adjacent the bale tying position of the baler.

Other and further objects of my invention reside in the construction and arrangement of parts for a hydraulically operated baler as set forth more fully in the specification hereinafter following by reference to the accompanying drawings in which Fig. 3 is a perspective view schematically illustrating the arrangement of parts of the hydraulic operating system of the baler and showing the coordination of the hydraulic control for the ram and the bale compressing means at the bale tying position; Fig. 6 is a horizontal longitudinal sectional view through the hydraulic operating mechanism and ram with certain of the parts illustrated in top plan view for showing the relationship of the hydraulic control mechanism and the ram of the baler; Fig. 9 is a vertical sectional view through the hydraulic cylinder taken on line 9—9 of Fig. 8.

Referring to the drawings in detail, reference character 1 designates the chassis structure of the pick-up baler which is supported in balanced relation on the transeverse axis 2 of the wheeled support 3. The baler includes at one end the pivotally mounted frame structure indicated generally at 4 which constitutes the pick-up or gatherer portion of the mechanism as explained more fully in my copending application Serial No. 525,787, filed March 9, 1944, for hay gathering and feeding mechanism for hay balers. The pick-up or gatherer is normally supported by the wheeled support represented at 5 suitably counterbalanced by springs represented at 6 and capable of being moved to an elevated position when it is desired to move the baler to the field. The pick-up mechanism is illustrated as including pick-up or gathering members 7 mounted on rotary carrier 8 for delivering the hay to the hay conveyor mechanism in trough structure 9 by which the hay is delivered to the receiving chamber indicated generally at 10 as located in front of the ram or plunger 11. The ram or plunger 11 reciprocates in the receiving chamber 10 within the confines of walls 12 for forcing the hay into compacting relation in the baling chamber in the position illustrated at 14. The plunger 11 is reciprocated under control of connecting rod 15 by the hydraulic mechanism shown generally at 16 and which will be described hereinafter in detail. The movement of the plunger 11 is coordinated with the movement of the wad board 17 operated through lever mechanism 18 journaled on support 19 and controlled through the crank and operating arm 20. The control of the wad board is timed with the movement of the plunger 11 and with the mechanism for compressing the bale in bale tying position adjacent the rear of the baler as represented generally at 21. The several moving mechanisms are all controlled by the hydraulic system 16.

The bale compressing mechanism for securing the compacted bales delivered from the baling chamber while performing the tying operation comprises pairs of arms indicated at 22 and 23 which are pivotally mounted at 22a and 23a on the frame or chassis of the baler at 24 and 25. The arms 22 and 23 are thus free to be moved transversely of the chassis as represented more clearly in Figs. 22 and 23 under control of the hydraulic cylinder represented at 26. The hydraulic cylinder 26 is secured at one end by suitable means such as rivet or bolt 27 to the vertically disposed angular member or strip 28 which is secured adjacent opposite ends to the transversely extending rod members 29 and 30 as represented at 29a and 30a which project horizontally of the frame of the baler through sets of guide lugs 31 and 32 projecting upwardly and downwardly from the rear end of the frame of the baler. Opposite ends of rod members 29 and 30 project beyond the sets of guide members and are secured at their ends 29b and 30b to the vertically extending angular strip 33 which bears directly against the pivotally mounted longitudinal extending arms 22.

Figure 1:
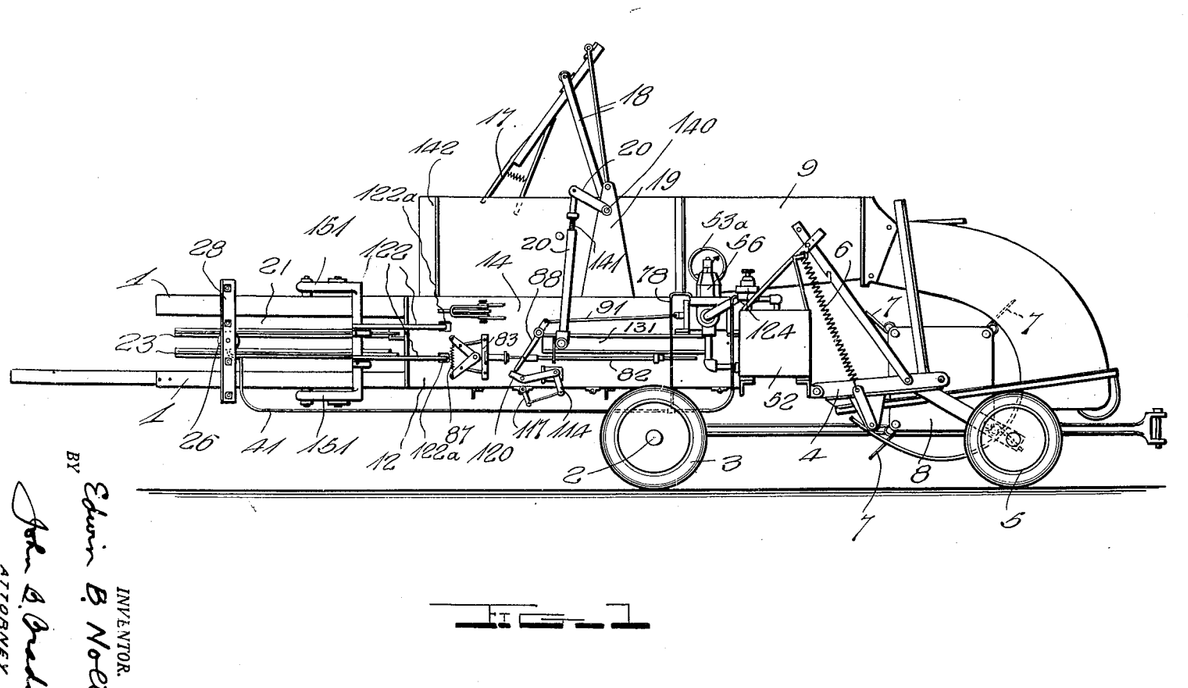
Fig. 1 is a side elevational view of the hydraulically controlled baler of my invention.

The two horizontally extending rod members 29 and 30 serve as carriers for the movable plate 34 which bears directly against the angularly movable arms 23 on one face and is attached centrally to the connecting rod 35 which leads to piston 36 which is operable in hydraulic cylinder 26. The introduction of the operating fluid to the interior of cylinder 26 as shown at 37 results in the ejection of piston 36 thereby serving to spread plate 34 with respect to strip-like member 28 and resulting in the movement of strip-like member 33 against angularly movable arms 22 while plate 34 bears against arms 23. The conjoint action is such as to shift arms 22 and 23 inwardly for securing the bale which I have indicated in dotted lines at 38 while the bale is in bale tying position. The bale that is clamped by arms 22 and 23 serves as the confining header against which the hay for the succeeding bale which is forming in the hay baling chamber in position 14 is compacted by plunger 11. Rod members 39 and 40 extend from the rear of plate 34 through the angle strip 28 and serve to adjustably unite plate 34 and strip 28 while enabling the clamping operation to be effected or released under control of hydraulic pressure supplied the cylinder 26 through pipe line 41. Pipe line 41 extends from the hydraulic system 16 as illustrated more clearly in Fig. 3. Suitable supports in the form of projecting lugs 42 extend from the chassis of the baler for mounting the pressure conveying pipe line 41 in position longitudinally of the chassis of the baler in a protective position for insuring against breakage of the pipe line. In Fig. 1 I have schematically illustrated pipe line 41 in order to clearly show the coordination between the hydraulic bale clamping means and the hydraulic system, but it will be understood that in actual practice pipe line 41 is confined directly against the chassis of the baler.

Figure 2:
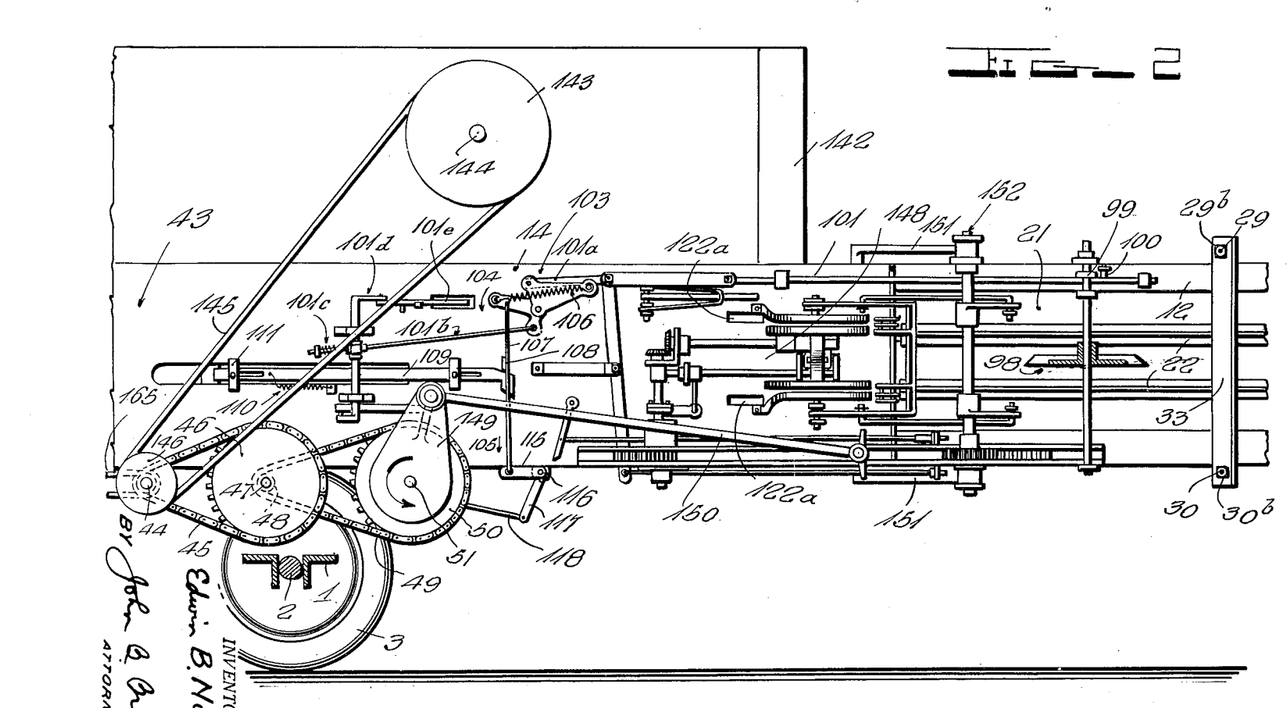
Fig. 2 is an enlarged view of the hydraulically controlled baler viewed from the opposite side of the baler from which the view of Fig. 1 is taken.

The driving engine of the baler is suitably supported by the chassis in a position which I have indicated generally at 43 in Fig. 2 and arranged to drive main shaft 44 which carries a sprocket wheel thereon which is linked by a sprocket drive chain 45 over sprocket wheel 46 mounted on transverse shaft 47. Shaft 47 carries a sprocket wheel 48 thereon over which sprocket chain 49 operates engaging the sprocket wheel 50 which operates shaft 51 of the tying mechanism in timed relation to the stroke of the plunger and wad board mechanism.

With the baler engine in location 43 running and connected to drive the pump 55 of the hydraulic system, which is located inside tank 52, constant volume of fluid is delivered to main control valve 53, Fig. 3, through main feed line 54 extending from pump 55 in tank 52. Reference character 56 indicates a safety valve for preventing excessive high pressure on main valve 53.

Figures 2, 4:
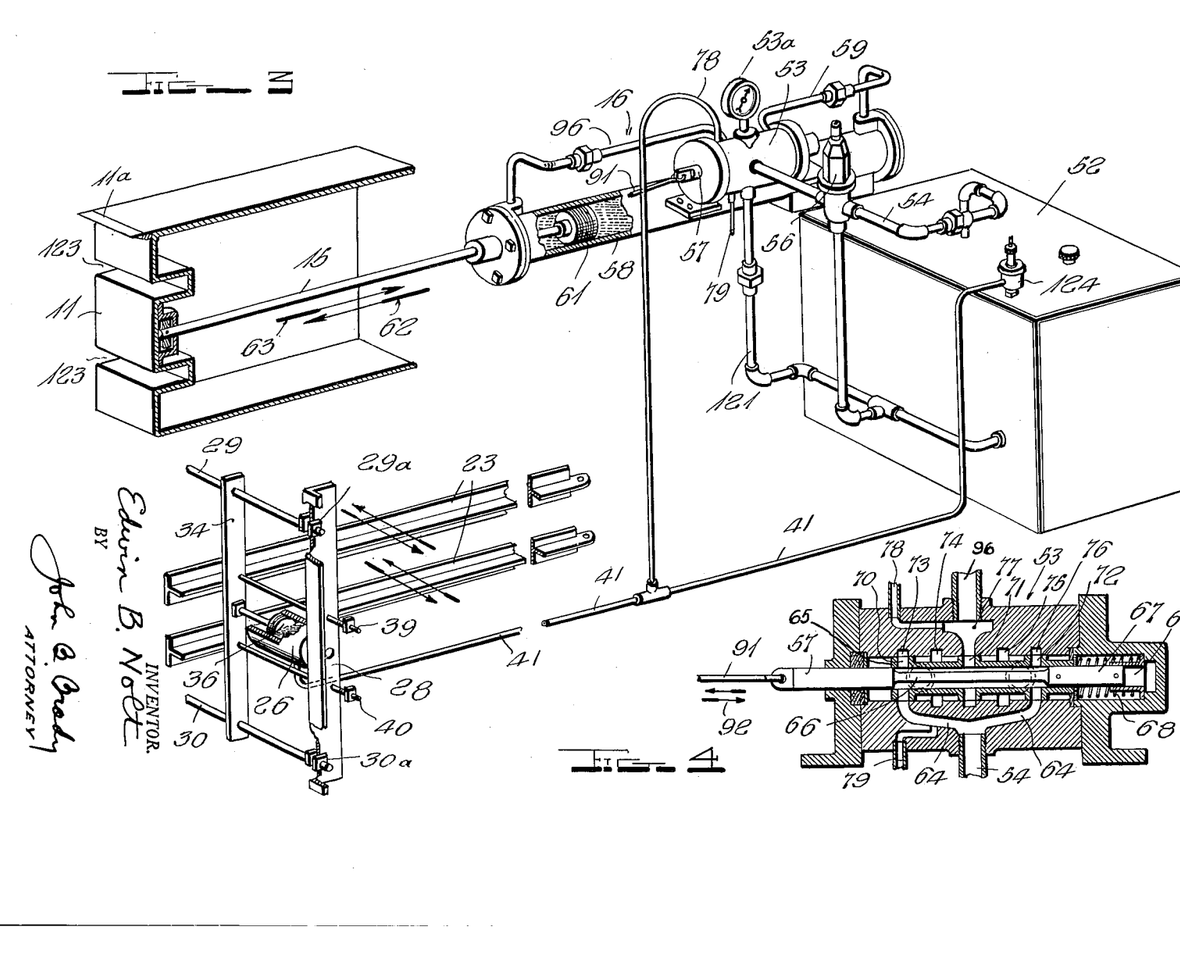
Fig. 4 is a longitudinal sectional view illustrating the hydraulic control valve employed in the hydraulic control system of my invention.

Due to the over center mechanism shown at 95 which will be explained hereinafter, main valve 53 always stops in either forward or rearward position of valve plunger 57, Fig. 4. Assuming that the valve plunger 57 stops in forward position, fluid will flow to cylinder 58 under pressure through line 59 to the rear end of cylinder 58 at 60, pushing piston 61 forward as in the direction of arrow 62, Fig. 3. Since the ram or plunger 11 is directly connected to piston 61 through connecting rod 15, it moves in the same direction as piston 61 at all times as indicated by arrows 62 and 63.

The valve 53 is of the open center balanced four-way piston type permitting oil to flow freely from the pump 55 through feed line 54 through ports 64 in the valve body. The valve body contains an arrangement of ports as illustrated at 64 and 77 for distributing fluid pressure from the intake 54 to the outlet. The plunger 57 operates a sleeve-like member 65 which fits over the reduced portion 66 of plunger 57. The end of plunger 57 is indicated at 67 slidable in sleeve-like member 69 against the action of spring 68. The sleeve-like member 65 carries a series of ports 70—71—72 which are adapted to register with the annular ports 73—74—75 and 76 in the valve body. The fluid may pass from the pressure inlet 54 to the pressure outlet 59 through the several ports and through the port 77. Auxiliary distribution ports connect with pipe lines 78 and 79 in the valve body as shown.

Figure 10:
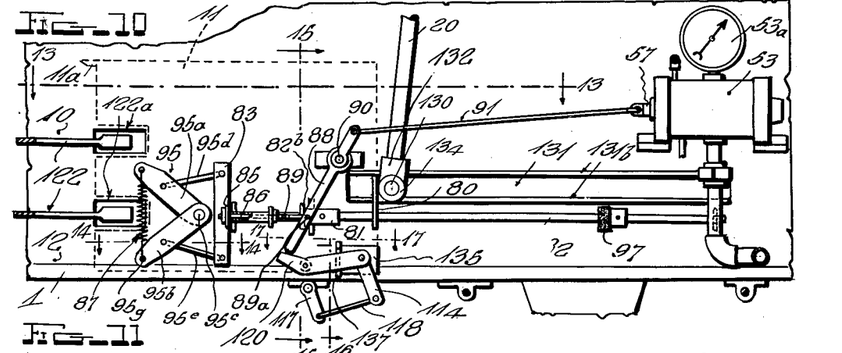
Fig. 10 is an enlarged side elevational view showing the stroke control mechanism of the hydraulically operated ram where the ram is performing a compressing function.
Figure 11:
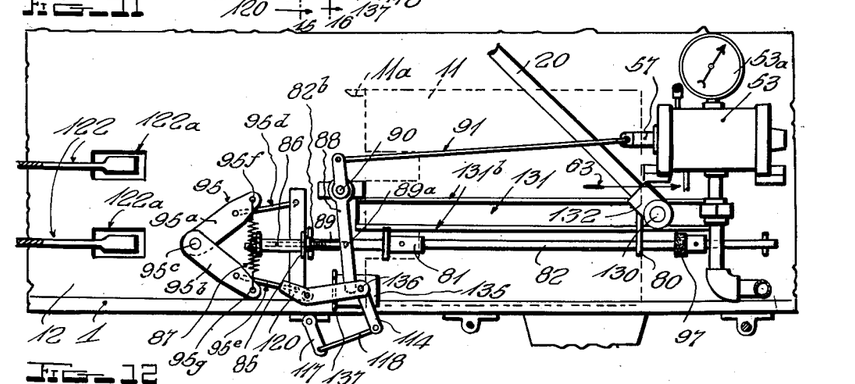
Fig. 11 shows the position of the stroke control mechanism of Fig. 10 wherein the ram has been withdrawn to its limit of travel preparatory to a compressing operation.
Figure 12:
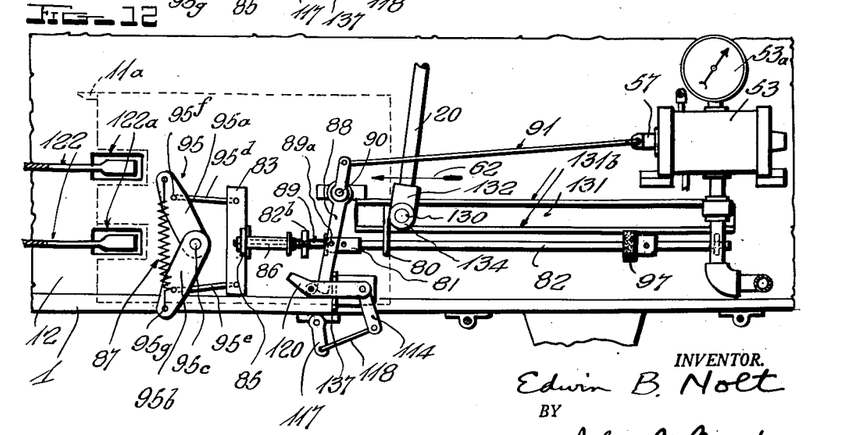
Fig. 12 illustrates the position of the stroke control mechanism just prior to the reversal of movement of the ram.
Figure 13:
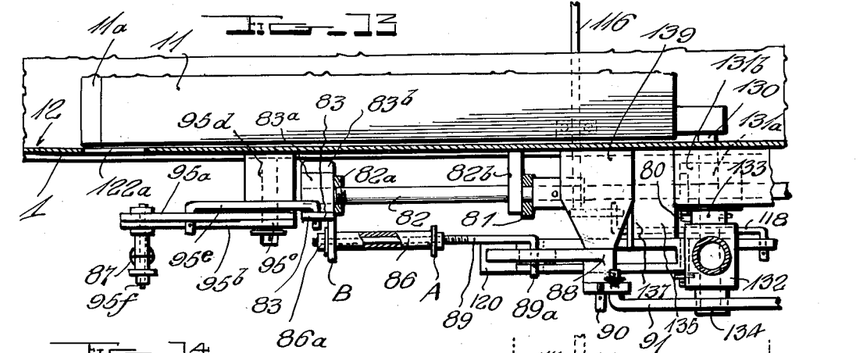
Fig. 13 is a fragmentary horizontal sectional view of the stroke control mechanism for the ram taken on line 13—13 of Fig. 10.
Figures 14, 17:
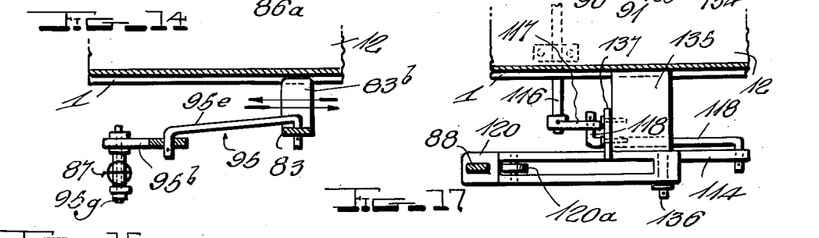
Fig. 14 is a fragmentary view of the linkage arrangement employed in the reversing mechanism taken substantially on line 14—14 of Fig. 10.
Fig. 17 is a fragmentary horizontal sectional view taken substantially on line 17—17 of Fig. 10.

When the ram or plunger 11 starts forward all elements are in the position as illustrated in Fig. 11. As plunger 11 continues its forward movement lug 80 Fig. 10, which is bolted to plunger 11, makes contact with bumper 81 and bumper 81 carries along with it shaft 82 and plate 83. As plate 83 moves forward, lug 85 which is fastened to plate 83 moves along slide 86 shown in Fig. 13 from point A to point B. When lug 85 moves to point B, plate 83 throws over center mechanism 95 to the position shown in Fig. 12 which is just beyond the over center position. The over center mechanism comprises a pair of arms 95a and 95b pivotally mounted at 95c and interconnected by spring 87. When the over center 95 reaches the position as shown in Fig. 12 the over center spring 87 throws the over center to the extreme forward position, Fig. 10, and carries along with it lug 85. As lug 85 is carried along it pulls with it slide 86 and link 89. Lever 88 is pivoted intermediate its ends at 90 as shown. Link 89 is connected to the lower end of lever 88 at 89a and to the upper end of lever 88 there is connected the link 91 which operates the valve plunger 57 of the main control valve 53. When link 89 is pulled forward as explained hereinbefore it causes lever 88 to rotate in a clockwise direction which moves valve plunger 57, Fig. 4, in direction of arrow 92, thus closing off the fluid flow to line 59, Fig. 3. The timing of the over center is to give the plunger the desired length of stroke.

When valve plunger 57 is moved to rearward position and closes off fluid flow from line 59 it at the same time opens valve port to line 96, Fig. 3, forcing piston 61 in a rearward direction (arrow 63) causing plunger 11 to move in a similar direction. As plunger 11 moves rearward lug 80 on plunger 11 makes contact with bumper 97, Fig. 10, at a predetermined time causing over center 95 to operate in an exact reverse direction as previously explained, closing off fluid supply through line 96 and opening line 59 thus completing one cycle. When fluid is going through one feed line to cylinder 58 the fluid is leaving the other end of the cylinder through the other feed line, thus both lines 59 and 96 act as feed and exhaust lines respectively. This cycle is repeated for continuous operation of the plunger, except that the valve plunger 57 is momentarily held in central position, in which it is drawn in Fig. 4 when a bale is being tied.

The operation of holding valve plunger 57 in central position will be apparent from a consideration of the coacting parts of the valve system.

Figures 21, 22:
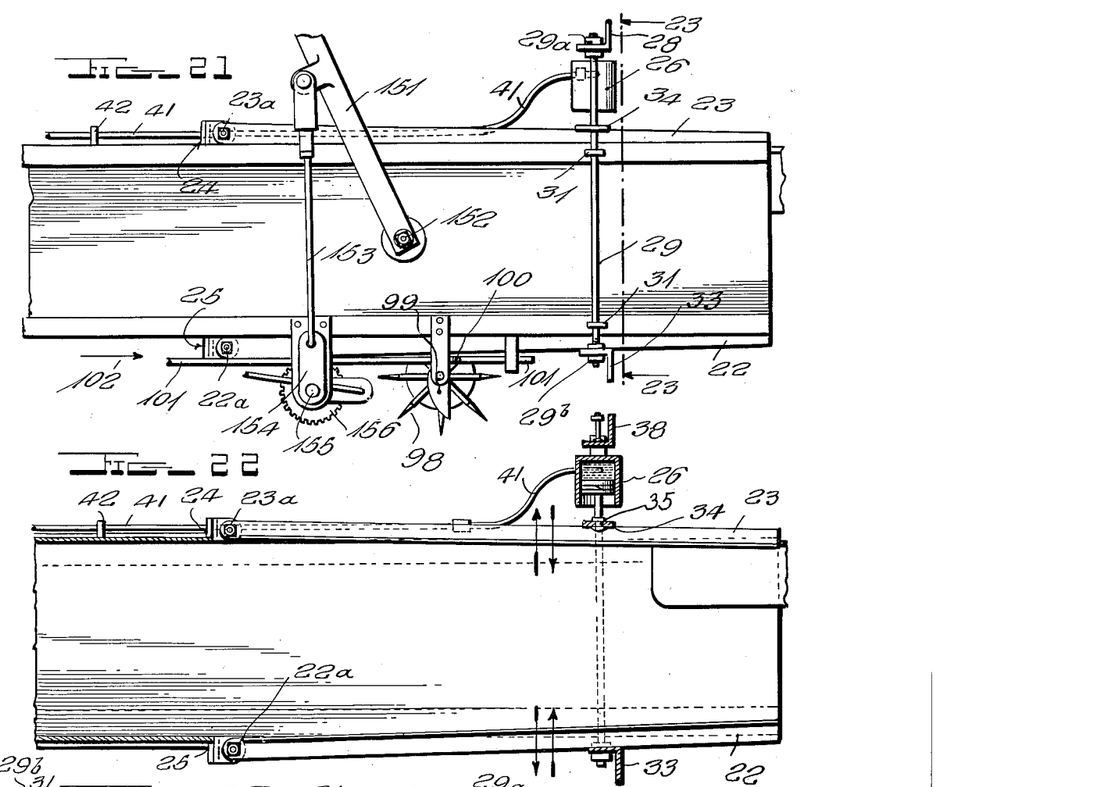
Fig. 21 is a top plan view of the bale handling mechanism at the end of the frame of the baler and illustrating the hydraulic mechanism for compressing the bale in the bale tying position.
Fig. 22 is a horizontal sectional view through the rear end portion of the baler with the hydraulic mechanism for compressing the bale in the bale tying position illustrated in horizontal section.

As material is accumulated in the baling chamber it turns the metering wheel 98, Fig. 21, in a clockwise direction. The prongs of the metering wheel 98 project into the side of the bale, thus turning as the bale moves along. Cam 99, Fig. 21, turns with metering wheel 98 making contact with roller 100 which is fastened to rod member 101. Thus cam 99 pushes against roller 100 moving rod member 101 in the direction as shown by arrow 102 in Fig. 21. Rod member 101 is connected to the over center mechanism 103 (entirely distinct from mechanism 95) Fig. 20, through line member 101a. When rod member 101 moves in the direction of arrow 102, Fig. 21, it throws over center 103, Fig. 20, from the position shown to downward position, as shown by the two arrows 104—105, Fig. 20. When over center 103 is thrown in the downward position the over center spring 106 puts a downward force on rod 107 to which is fastened lug 108. Lug 108 rests on slide 109. The over center 95 is always tripped on the forward cycle of the plunger travel because material is accumulated in the baling chamber only on the forward travel of the plunger 11. A restoring force is applied to over center 103 through link 101b, spring 101c and trip mechanism 101d—101e operated by the reciprocating plunger 11.

Figures 15, 16, 18, 19, 20:
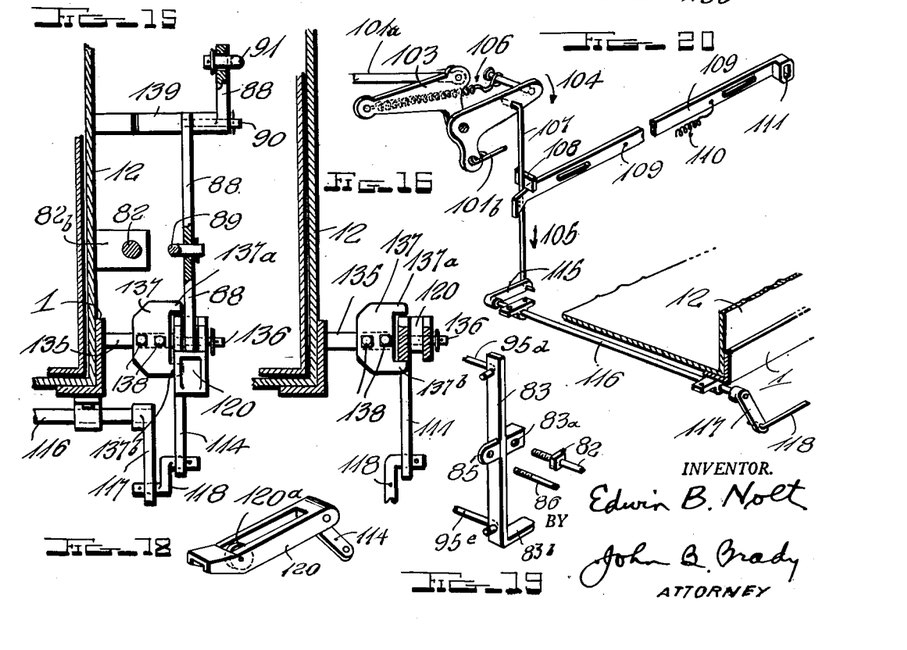
Fig. 15 is a fragmentary vertical sectional view of the leverage system of the reversing mechanism taken substantially on line 15—15 of Fig. 10.
Fig. 16 is a fragmentary vertical sectional view taken on line 16—16 of Fig. 10.
Fig. 18 is a perspective view of one of the lever elements employed in the reversing mechanism of Fig. 10.
Fig. 19 is a perspective view of one of the operating levers employed in the reversing mechanism of Fig. 10.
Fig. 20 is a perspective view illustrating the actuating means for the operating mechanism illustrated in Fig. 10, the view being taken substantially on line 15—15 of Fig. 10.

When the plunger 11 moves forward, spring 110, Fig. 20 connected to slide 109 pulls slide 109 forward with it and thus the forward end of slide 109 is always under lug 108 when over center 103 trips thus arresting lugs 108. As plunger 11 moves rearward it makes contact with bumper 111, Fig. 20, which is fastened to slide 109, moving the slide rearward with the plunger. When the forward end of slide 109 moves past lug 108, rod 107 is pushed downward due to pressure of the over center spring 106.

Rod 107, Fig. 20, is connected to the valve plunger arresting device 120, Fig. 18, through members 115, 116, 117 and 118 arranged with respect to the baler chassis as shown in Figs. 20 and 10-17. Since rod 107 can drop only when plunger 11 is in the extreme rearward position, it swings member 120, Figs. 10-12, in the position shown at the same time that plate 83 is moved from the position shown in Fig. 10 to the position shown in Fig. 11 by over center 95. Now, after rod 107 has dropped and moved member 120 to position shown in Fig. 12 the plunger 11 moves to extreme forward position, and trips over center 95, but because the arresting device is as shown in Fig. 12 arm 88 can move only part of its normal travel and it and over center 95 are held in position as shown in Fig. 12, thus holding valve plunger 57 in central position and blocking the valve ports to both feed lines 59 and 96, Fig. 3, and opening valve ports to exhaust line 121, Fig. 13, which returns the fluid delivered to main valve 53 back to tank 52. This holds plunger 11 in the extreme forward position, since no fluid can enter or leave the cylinder 58 when both feed lines are closed off; at this time the tying needles indicated generally at 122 operate transversely through slots 123 in the plunger 11 and through aligned openings 122a in the chassis of the baler and the bale is tied. Over center 103, Fig. 20, is automatically returned to the position shown in Fig. 20 and the over center 103 pulls rod 107 up through operational members 115, 116, 117 and 118 thus releasing arresting device 120 through link 114 which in turn frees lever 88 and tension of spring 87, Fig. 12, and operates control valve 53 opening valve ports to feed line 96, Fig. 3, and plunger 11 continues its normal cycle.

One of the important features of my invention is the timing of the bale typing operation with the plunger 11 held hydraulically in its extreme forward position. This is made possible by the control of the tying mechanism within the time period that the plunger 11 and associated mechanism remains in the position shown in Fig. 12.

Figure 23:
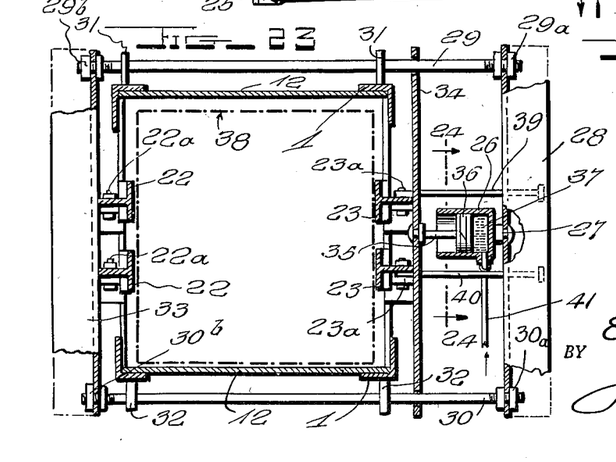
Fig. 23 is a vertical sectional view taken on line 23—23 of Fig. 21 with the hydraulic operating mechanism for compressing the bale in bale tying position illustrated in section and elevation.
Figure 24:
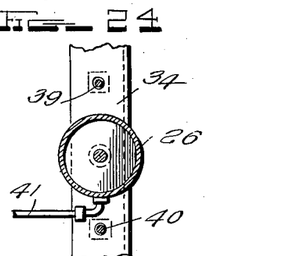
Fig. 24 is a vertical sectional view through the hydraulic control mechanism of the bale compressor taken substantially on line 24—24 of Fig. 23.

The feed line 78, Fig. 3, starts at main control valve 53 and goes to cylinder 26 through pipe line 41 and builds up pressure behind piston 36 in cylinder 26 which exerts pressure on plate 34, Fig. 23. The pressure condition at the main control valve is continuously indicated by the pressure indicator shown at 53a. Plate 34 bears against the pivoted tension rails 23. As heretofore explained the opposite end of cylinder 26 is fastened to member 28. Tension rails 22 bear against angular strip 33 which by reason of its connection through rod members 29 and 30 with strip 28 and coaction with strip 34 applies equal pressure to the sets of pivoted tension rails 22 and 23. Rods 29 and 30 are free to slide in bearings 31 and 32 respectively. Line 41, Fig. 3, is the exhaust line which returns to tank 52 through relief valve 124 which can be set for any desired pressure up to the maximum pressure on main control valve 53, thus keeping equal pressure on the sets of tension rails 22 and 23 at all times.

The advantages of the hydraulically operated tension rails may be summarized as follows:

1. Makes possible a shorter hay baling chamber, thus saving material and weight. The hay baling chamber is in position 14 between the hay receiving chamber 10 and the header formed by the bale that is clamped in the bale tying position by arms 22—23.
2. Makes all bales of the same weight when the material has the same moisture content.
3. Prevents springing of baling chamber when using heavy material.
4. Allows easier and more accurate adjustments to be made and reduces maintenance costs and shutdowns.

Figures 7, 8:
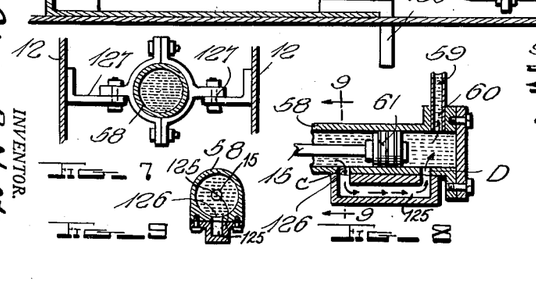
Fig. 7 is a transverse sectional view taken through the hydraulic operating means on line 7—7 of Fig. 6.
Fig. 8 is a fragmentary vertical sectional view illustrating the position of the hydraulic piston in the hydraulic operating cylinder of Fig. 5 in its position where the ram is about to reverse for effecting a forward movement for compressing the material to be baled.

Due to the momentum of plunger 11 and the flowing fluid considerable hydraulic knock may be produced when main control valve 53 reverses the flow of fluid unless some means of cushioning the shock is provided. To take care of this shock a small by-pass 125, shown in Figs. 8 and 9, is located at the rearward end of the cylinder 58. The material in the baling chamber opposes the plunger travel considerably in the forward end of the cylinder 58 and this provides a cushioning effect, making it unnecessary to place a by-pass in the forward end of the cylinder.

When the piston 61 is moving rearwards and as soon as it reaches position C, Fig. 8, part of the fluid supplied to it by-passes around to the other end of the piston through by-pass 125 and out the exhaust line, thus slowing up the piston gradually. While the piston is traveling between positions C and D, the main control valve 53 is shifted and the fluid enters at the rearward end of cylinder 58. A small amount of the fluid again escapes past the piston 61 until it has again passed position C in the other direction. The aperture 126 in the by-pass must be sufficiently small that not all the fluid supplied to the cylinder 58 can escape through the by-pass 125 under the pressure required to move the piston 61 or the piston 61 would not start its forward movement when the main control valve 53 is shifted. The cylinder 58 and appurtenances are suitably supported by the framing 127 extending to the chassis as shown in Fig. 7.

The mounting means for the parts of the stroke control mechanism are shown more clearly in Figs. 13-20 from which it will be seen that the over center mechanism 95 is pivotally supported at 95c by means projecting from the side wall 12 of the baler on which the spacer member 95d is arranged for maintaining the pair of arms 95a and 95b in spaced relation to the side wall of the baler. It will also be seen that the position of the pivot 95c and spacer 95d is such that in one of the extreme limits of the position of the over center mechanism 95, the shaft 82 and its connection with plate 83 clears the mounting means and over center mechanism without obstruction. The connection between shaft 82 and plate 83 will be more clearly understood by observing Figs. 13, 14 and 19 from which it will be seen that plate 83 has a block 83a projecting therefrom at one side and lug 85 projecting therefrom at the other side. The plate 83 has a transversely projecting end portion 83b serving to steady or stabilize plate 83 with respect to the wall 12 of the baler. The shaft 82 which is screw threaded into block 83a is locked to block 83a by nut 82a. The slide 86 is shown connected with lug 85 of plate 83 by means of nut 86a. The arms 95a and 95b connect with plate 83 through links 95d and 95e which operate the arms 95a and 95b in the successive forward and reverse movements. The free ends of arms 95a and 95b each carry transversely extending pin members 95f and 95g which serve as spacer means extending from arms 95a and 95b between which coil spring 87 acts.

Shaft 82 is suitably supported for longitudinal movement with respect to the side wall 12 of the baler by suitably located projecting lugs represented at 82b so spaced as to offer no obstruction to the movement of the bumper 81 that is carried by shaft 82 for coaction with the lug 80. As heretofore explained, the lug 80 is bolted to plunger 11 through the intermediary of member 130 which is fastened to the inside wall of plunger 11 and projects through the longitudinally extending slot 131 in the side wall 12 of the baler. Rails 131b extend longitudinally on either side of the slot 131 and serve as guide rails. Member 130 carries roller 131a and block 132 thereon with spacer sleeve 133 therebetween and with confining means 134 on the end thereof. Roller 131a rides between the rails 131b removing strain from the member 130. Spacer sleeve 133 serves as a carrier for lug 80 which projects transversely into the path of the bumper 81. Lug 80 may be bifurcated at its end to partially embrace shaft 82 to insure positive abutment with bumper 81.

The mechanism constituting the tripping member 120 is pivotally mounted with respect to the baler on a bracket 135 that projects from one wall of the baler at 12 and carries pivot pin 136 around which member 120 is adapted to rock. The angular distance through which member 120 may rock is restricted by means of plate member 137 secured to bracket 135 by means of bolts 138. Tongues 137a and 137b project from plate member 137 embracing opposite sides of member 120 in the course of its angular movement and serving as abutments to restrict such movement.

The pivotal mounting means for the lever 88 at 90 extends from a bracket 139 projecting transversely from the wall 12 of the baler. The spacial relation of bracket 139 to the pintle formed thereon is such that lever 88 is adequately spaced from the side wall of the baler to allow proper operation of all parts of the stroke control mechanism.

The block member 132 which is mounted on the projecting member 130 that connects with plunger 11 serves as a connecting means for the operating arm 20. As heretofore explained, the operating arm 20 connects to the crank which is journalled on the support 19 at 140. The relationship of the operating arm and crank 20 may be varied through the screw adjustment means represented at 141 (Fig. 1). As the plunger 11 moves in its horizontal path the operating arm and crank 20 is moved through an angular distance controllable to effect the required throw of the wad board 17 for packing the hay which is delivered over the front of the baler into the baling chamber through the aperture designated at 12a in Fig. 5. The end of the hay conveying chamber is represented generally at 142 defining an area limited by the aperture 12a through which the hay is compacted in front of the plunger 11 at the time during the cycle of movement of the plunger represented in Fig. 11 where the hydraulic piston 61 has been driven to a position adjacent the end of the hydraulic cylinder 58 as presented in Fig. 8. The hay is gathered by the pick-up or gathering members 7 mounted on rotary carrier 8 at the front of the baler and delivered by conveying mechanism to a position for compacting by the wad board 17 as is more fully set forth in my co-pending application Serial No. 525,787, filed March 9, 1944, supra. The hay conveying mechanism is driven through drive pulley 143 carried by shaft 144 under control of driving belt 145 engaged by driving pulley 146 carried by main shaft 44 as more fully explained in my aforesaid co-pending application.

For the purpose of showing the relation of the parts of the tying mechanism of the baler to the other component parts thereof, I have shown in Fig. 2 the arrangement of the tying mechanism in the position generally illustrated at 148. The tying mechanism is driven from shaft 51 through clutch 149 and connecting rod 150 which imparts reciprocative movement to the driving elements of the tying mechanism shown generally at 148. For details of the tying mechanism, reference is made to my co-pending application Serial No. 537,900 for automatic balers, filed May 29, 1944. To illustrate the coordination of the tying mechanism with the other parts of the baler, I have shown the arms 151 which serve as carriers for the needles 122 pivotally mounted with respect to the frame of the baler as represented at 152. The cyclic swinging movement of the arms 151 is controlled through connecting rods 153 and links 154 driven by shaft 155 from gear system 156 (Fig. 21).

Figure 5:
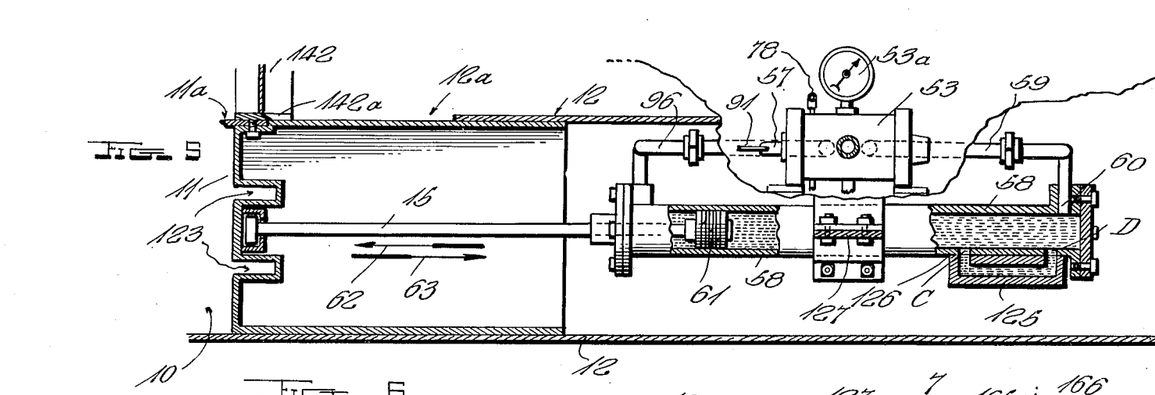
Fig. 5 is a longitudinal vertical sectional view illustrating the coaction between the hydraulic operating mechanism and the ram of the baler with parts of the hydraulic actuating mechanism illustrated in side elevation.

The operation of the hydraulically controlled baler may be summarized by considering the driving engine in position 43 operating main shaft 44 for driving pump 55 through sprocket chain connection 165 interconnecting shafts 44 and 166 (Figs. 2 and 6). Valve 53 controls the admission of fluid pressure to either side of piston 61 in hydraulic cylinder 58 and to the cylinder 26 of the bale clamping mechanism in timed relation under control of valve plunger 57 operated by lever 88 (Figs. 10–12). The wad board 17 operates in timed relation to the movement of plunger 11 through member 130 and arm and crank 20 to pack the hay through aperture 12a into the hay baling chamber in position 14 shown in Fig. 1. The plunger 11 carries a shearing knife 11a thereon which co-acts with a cutting blade 142a that is associated with the end wall 142 of the hay feeding portion of the baler as shown in Fig. 5 for cutting off the excess hay that cannot be compacted into the hay baling chamber at each packing stroke of the plunger.

As heretofore pointed out, the baling chamber proper is relatively short and the bale that is clamped in bale tying position by arms 22—23 actuated by hydraulic cylinder 26 serves as a header for the succeeding bale that is being formed by the successive operations of wad board 17 and the horizontal movement of plunger 11. The special construction of by-pass 125 in the hydraulic cylinder 58 cushions the shock on the rearward movement of plunger 11 as has been clearly described. The valve plunger 57 controlled by lever 88 is shifted under control of the over center mechanism 95 as heretofore explained. It will be observed in Fig. 10, where plunger 11 is in its extreme position for compressing the hay in the baling chamber, the lever 88 is clear of engagement with member 120 and in this position, fluid pressure is admitted by valve 53 through pipe 96 to hydraulically move piston 61 in cylinder 58 in the direction of arrow 63 (Fig. 5). In the condition illustrated in Fig. 10 the over center mechanism 95 has its arms drawn together at an acute angle by coil spring 87 in the position shown. On the reverse stroke illustrated in Fig. 11, the arms 95a and 95b of over center mechanism 95 are each moved through an angle of approximately 90° and the arms drawn by spring 87 to an acutely angled relation illustrated in Fig. 11. During this movement arm 20 connected to member 130 connected to plunger 11 serves to pack hay into the hay baling chamber through aperture 12a in front of the plunger 11. Lever 88 clears the roller 120a carried by member 120 in the course of the reverse movement illustrated in Fig. 11. However on the forward stroke where hydraulic pressure is admitted through pipe 59 to hydraulic cylinder 58 in front of piston 61, member 120 has rocked about center 136 so that roller 120a of member 120 engages the end of lever 88 as illustrated in Fig. 12. Under these conditions, over center 103 trips, removing roller 120a from engagement with the end of lever 88 and allowing lever 88 to move through the remaining part of its normal travel. Fig. 12 indicates the position in which plunger 11 has moved to its extreme forward position tripping over center 95 but in which the arresting device 120 allows arm 88 to move through only part of its normal travel so that arm 88 and over center 95 are held in the position shown in Fig. 12, holding valve plunger 57 in central position and blocking the valve ports to both said lines 59 and 96 and opening the valve ports to the exhaust line 121 returning the fluid delivered to the main valve 53 back to the tank 52. This holds plunger 11 in the extreme forward position since no fluid can enter or leave cylinder 58 when both said lines are closed off. During this interval the tying needles 122 operate transversely through apertures 122a in the side walls of the baler and through slots 123 in the plunger 11 for tying the bale in accordance with the principles set forth in my copending application Serial No. 537,900, filed May 29, 1944, supra.

The wire carrying reels that supply the wire to the wire tying mechanism are suitably suspended from the chassis of the baler and feed the wire to the wire tying mechanism of the baler shown generally at 148. The wire supply reels have been omitted from the illustrations herein for purposes of simplification but are shown in detail in the bale tying disclosure of my application Serial No. 537,900. filed May 29, 1944, supra. It is sufficient to note herein that the bale that is being tied serves as a header against which the material for the succeeding bale is packed and that wire ties are automatically laid in position for the bale to be formed and receives the hay which is packed against it and is stretched along the sides of the inner walls of the baler as the hay is packed and filled into the baling chamber by the hydraulically operated plunger.

As heretofore explained, the tripping of overcenter 103 which makes possible the removal of obstructing roller 120a from the end of lever 88 is effected by the movement of rod member 101 controlled by cam 99 and roller 100 (Fig. 21). The movement of cam 99 through a cycle of angular displacement depends upon the rotation of metering wheel 98 which projects into a side of the bale as it is being advanced longitudinally of the baler. Thus the forming and delivery of the bale itself sets into motion a series of sequential steps that result in the automatic control of the hydraulically operating system. The continued cycling of the hydraulic system is effected by the coaction of the many functions of the several parts of the mechanism I have illustrated.

The apparatus shown herein has been constructed and successfully operated and while the arrangements herein shown constitute one of the preferred embodiments of my invention, I realize that changes and improvements may be made and I do not intend that the structures herein shown shall be considered as the only way of carrying out my invention. I intend that changes and modifications in design and arrangement may be made and I intend no limitations other than may be imposed by the scope of the appended claims.

What I claim as new and desire to secure by Letters Patent of the United States is as follows:

1. A hydraulically controlled baler comprising a hydraulic operating cylinder, a piston reciprocative in said cylinder, a hay baling plunger connected with said piston, a hay baling chamber in which said hay baling plunger is arranged to reciprocate, means for successively introducing hay into said hay baling chamber for successive compacting operations thereon by said hay baling plunger for accumulating compacted hay in said hay baling chamber, sets of bale gripping members, hydraulic means for operating said members for successively clamping the bales in a position forming a header abutment for the succeeding bale accumulated in said hay baling chamber, and means operated by the amount of accumulation of hay against the header formed by the preceding bale for arresting the operation of said hydraulic piston in said hydraulic cylinder.

2. Hay baling mechanism comprising a frame structure, a hay baling chamber intermediate said frame structure, bale gripping means carried by said frame structure at one end of said hay baling chamber, a hay baling plunger mounted on said frame structure adjacent the other end of said hay baling chamber, hydraulic operating means comprising a hydraulic cylinder, a piston operative therein, a connection between said piston and said hay baling plunger, hydraulic means for operating said bale gripping means, and means controlled by the accumulation of hay compacted between the end of a bale secured by said bale gripping means and said hay baling chamber for arresting the introduction of hydraulic fluid into said hydraulic cylinder.

3. Hay baling mechanism comprising in combination a frame structure, a hay baling chamber mounted intermediate said frame structure, bale clamping means mounted adjacent one end of said frame structure and interconnected with said hay baling chamber, a hay baling plunger mounted adjacent the other end of said hay baling chamber and reciprocative therein for compacting hay delivered to said hay baling chamber against a header constituted by a previously formed bale gripped by said bale clamping means, a wad board for delivering hay to said hay baling chamber, mechanism for coordinating the movement of said wad board with the reciprocative operation of said hay baling plunger, hydraulic operating mechanism comprising a hydraulic cylinder and a hydraulic piston operative therein and connected with said hay baling plunger, hydraulic means for controlling the operation of said bale clamping means, and metering mechanism controlled by the accumulation of compacted hay in said baling chamber intermediate said baling plunger and the end of a previously formed bale secured by said clamping means for controlling the operation of said hydraulically operating mechanism and said hydraulic means.

4. Hydraulically controlled baling mechanism comprising a hydraulic cylinder, a piston operative in said cylinder, means for controlling the introduction and discharge of fluid with respect to opposite ends of said cylinder for reciprocating said piston in said cylinder, a connecting rod extending from said piston, a baling plunger operated by said connecting rod, a baling chamber within which said baling plunger reciprocates, an over center mechanism displaceable from a normal position to an operated position in accordance with the quantity of material accumulated by the compacting operation of said plunger in said hay baling chamber, and means controlled by the movement of said over center mechanism to operated position for arresting the introduction and discharge of fluid into said hydraulic cylinder.

5. Hydraulically controlled baling mechanism comprising a hydraulic cylinder, a piston operative in said cylinder, means for controlling the introduction and discharge of fluid with respect to opposite ends of said cylinder for reciprocating said piston in said cylinder, a connecting rod extending from said piston, a baling plunger operated by said connecting rod, a baling chamber within which said baling plunger reciprocates, an over center mechanism displaceable from a normal position to an operated position depending upon the quantity of material accumulated in said baling chamber under control of the reciprocative compacting operation of said plunger, and a second over center mechanism for arresting operation of said piston in said hydraulic cylinder when the quantity of compacted material accumulated in said baling chamber reaches a predetermined size.

6. Hydraulically controlled baling mechanism comprising a hydraulic actuating mechanism, a baling plunger reciprocative under control of said hydraulic actuating mechanism, a baling chamber within which said baling plunger reciprocates, a valve for controlling the flow of fluid through said hydraulic actuating mechanism, a lever member pivoted with respect to said baler, a connection between one end of said lever member and said valve for controlling the operation of said valve, and means engageable with the opposite end of said lever member for obstructing the movement of said lever member for a time period determined by the accumulation of baled material in said baling chamber for correspondingly controlling the operation of said hydraulic actuating mechanism.

7. Hydraulically controlled baling mechanism comprising a hydraulic actuating mechanism, a baling plunger reciprocative under control of said hydraulic actuating mechanism, a baling chamber within which said baling plunger reciprocates, a valve for controlling the flow of fluid through said hydraulic actuating mechanism, a lever member pivotally mounted with respect to the baler, a connecting rod between one end of said lever and said valve, means for obstructing the movement of the other end of said lever, an over center mechanism, a connection between the last mentioned end of said lever and said over center mechanism, and means controlled by the quantity of material accumulated in said baling chamber for removing the aforesaid obstruction to the movement of said lever member whereby said over center mechanism is rendered effective for operating said valve and controlling the flow of fluid to said hydraulic operating mechanism.

8. Hydraulic mechanism for balers comprising a hydraulic operating mechanism, a baling plunger operated by said mechanism, a baling chamber in which said baling plunger operates for compacting material to be baled, a valve for controlling the operation of said hydraulic operating mechanism, a lever member connected with said valve for controlling the position thereof, spring actuated mechanism for controlling the operation of said lever member, means engageable with said lever member for restraining the operation of said lever member by said spring actuated mechanism, and means controlled by the amount of the accumulation of material in said baling chamber for removing the obstruction to the movement of said lever member for pressing said lever member under control of said spring actuated mechanism for effecting operation of said valve at a predetermined time in the cycle of operation of said baler mechanism.

9. Hydraulic baling mechanism comprising hydraulic operating means including a hydraulic cylinder, a piston therein, a baling plunger operated by said piston a baling chamber in which said baling plunger reciprocates, a valve for controlling the flow of fluid to said hydraulic cylinder, a lever pivotally mounted with respect to said baling mechanism and connected at one end with said valve, a spring actuated mechanism connected with the other end of said lever and selectively movable to any of three positions for correspondingly controlling said valve and the flow of fluid to said hydraulic cylinder, means for effecting cyclic movement of said spring actuated mechanism to either of two of said positions in accordance with the reciprocative movement of said baling plunger, means for restraining the movement of said lever to said third position depending upon the accumulation of material to be baled in said baling chamber, and means for releasing said lever for movement under control of said spring actuated mechanism to said third position upon predetermined accumulation of material in said baling chamber.

10. Hydraulic baling mechanism comprising hydraulic operating means including a hydraulic cylinder, a piston therein, a baling plunger operated by said piston, a baling chamber in which said baling plunger reciprocates, a valve for controlling the flow of fluid to said hydraulic cylinder, a lever pivotally mounted with respect to said baling mechanism and connected at one end with said valve, and selectively movable to either of two positions for controlling the reciprocation of said baling plunger and/or to a third position for arresting the movement of said baling plunger, spring means for effecting movement of said lever alternately to the aforesaid two positions, and supplemental spring means for removing the obstruction to movement of said lever to the third position thereof and effecting movement of said lever to said third position for arresting movement of said baling plunger.

EDWIN B. NOLT.